United States Patent [19]

Yamada et al.

[11] Patent Number: 5,020,968

[45] Date of Patent: Jun. 4, 1991

[54] SYSTEM FOR CONTROLLING THE ROTATING SPEED OF A PNEUMATICALLY DRIVEN SPINDLE

[75] Inventors: Akio Yamada; Fumio Hayashi, both of Tokyo, Japan

[73] Assignee: Ishikawajima-Harima Heavy Industries Co., Ltd., Tokyo, Japan

[21] Appl. No.: 324,149

[22] Filed: Mar. 16, 1989

[30] Foreign Application Priority Data

| Apr. 15, 1988 | [JP] | Japan | 63-49930[U] |
| Apr. 21, 1988 | [JP] | Japan | 63-52787[U] |
| Sep. 30, 1988 | [JP] | Japan | 63-127081[U] |

[51] Int. Cl.$^5$ .............................................. F01D 17/06
[52] U.S. Cl. .................................... 415/36; 415/39; 409/231; 408/702; 318/254
[58] Field of Search ............... 415/16, 17, 36, 39, 415/904; 409/231; 408/702; 318/254

[56] References Cited

U.S. PATENT DOCUMENTS

| 3,096,467 | 7/1963 | Angus et al. | 318/254 |
| 3,817,651 | 6/1974 | Law et al. | 415/36 |
| 4,076,449 | 2/1978 | Theis, Jr. et al. | 415/36 |
| 4,088,908 | 5/1978 | Gumen et al. | 318/254 |
| 4,426,845 | 1/1984 | Brooks et al. | 415/36 |
| 4,475,865 | 10/1984 | Sugishita et al. | 415/36 |

*Primary Examiner*—John T. Kwon
*Attorney, Agent, or Firm*—Dykema Gossett

[57] ABSTRACT

A rotating speed control system for a pneumatically driven spindle used in a machine tool, comprises a spindle possessing a male-threaded part, a turbine mounted on the spindle by a nut with a convexo-concave portion being formed in one face thereof, a casing for accommodating the spindle and the turbine, an air supply line connected to the casing so as to supply air to drive the turbine, a valve disposed in the air supply line so as to adjust the flow rate of the air to be supplied to the turbine, a sensor facing the convexo-concave portion of the nut so as to detect the rotating speed of the turbine, and a control circuit for comparing a sensor detected rotating speed with a predetermined rotating speed and for adjusting the valve in accordance with the difference between two rotating speeds, so as to reduce the difference.

6 Claims, 3 Drawing Sheets

SYSTEM FOR CONTROLLING THE ROTATING SPEED OF A PNEUMATICALLY DRIVEN SPINDLE

BACKGROUND OF THE INVENTION

1. Technical Field

The present invention relates to a system for controlling the rotating speed of a spindle driven by pneumatic power and more specifically it relates to such a system capable of maintaining the rotating speed of the spindle constant independently of a load imposed on the spindle.

2. Background Art

A machine tool, as illustrated in FIG. 1 of the accompanying drawings, which employs a pneumatically driven spindle has been previously developed to improve cutting surface accuracy as well as cutting efficiency. A spindle 2 is rotatably disposed in a spindle casing 1. Mounted on one end of the spindle 2 is a tool 4 for cutting a workpiece 3, and mounted on the other end thereof is an air turbine 5 for receiving air so as to rotate the spindle 2. The air turbine 5 is driven by air 6 of constant flow rate which is supplied from a source (not shown).

Two types of non-contact, rotating speed detecting arrangements are generally known for use with the above mentioned spindle. One is an arrangement associated with an optical sensor, wherein light deflected by the spindle is received by the optical sensor and the rotating speed is calculated by peripheral elements. The shortcoming of this arrangement is that the detecting accuracy of the sensor is deteriorated when lubrication oil, for example, adheres to the spindle.

FIG. 2 illustrates the other type of non-contact, rotating speed detecting arrangement. The air turbine 5 is fixed on the spindle 2 by a nut 10, and a gear 7 is also attached to the spindle 2. The gear 7 is a spur gear, for instance, and it possesses a convexo-concave part 8 along the periphery thereof. A rotating speed detector in the form of an electromagnetic pickup 9 is provided near the gear 7 in the radial direction of the gear 7. The magnetic power between the convexo-concave part 8 and the electromagnetic pickup 9 varies as the spindle 2 rotates, and electrical pulses are produced due to the changing magnetic power, which are in turn processed to yield the rotating speed. In this arrangement, space for the pickup 9 is required in the radial direction of the gear 7. This means that the dimensions of the spindle casing 1 of FIG. 1 have to be large. Also, the rotating speed of the spindle 2 changes due to the cutting load since the flow rate of the air 6 is constant. More specifically, as shown in FIG. 3, the actual rotating speed of the spindle, N1 is set to the desired rotating speed N during mode A. During the mode B in which the tool 4 is contacting the work 3, the actual rotating speed N1 is decreased by the cutting load until the rotating energy and the braking effort are in balance with each other. After that, the rotating speed of the spindle 2, N1 is raised to the desired value N by an operator by changing the flow rate of the air supplied to the turbine 5. Upon the completion of cutting, the spindle 2 leaves the workpiece 3 and at this time the actual rotating speed N1 unnecessarily increases (mode C). It is also predicted that the manual speed control during the mode B will result in non-preferred cutting. Furthermore, in the event that the depth of cutting is program-controlled and an unduly large depth of cutting is programmed, the spindle 2 would be stopped when the resistance force against the spindle overcomes the rotating torque of the spindle 2. In this case, the spindle 2 starts rotating at a very high speed as it leaves the workpiece 3, which is dangerous.

SUMMARY OF THE INVENTION

One object of the present invention is to provide a compact, rotating speed detecting system for an air driven spindle.

Another object of the present invention is to provide a system for controlling the rotating speed of an air driven spindle, which system adjusts the flow rate of the air supplied to the turbine based on the load the spindle bears, so as to keep the rotating speed at a predetermined value, which in turn enables automatic operation and insures high accuracy in machining.

Still another object of the present invention is to provide a system for controlling the rotating speed of an air driven spindle, which system prevents the spindle from rotating if the cutting load rises an undue amount.

According to one aspect of the present invention, there is provided a rotating speed detecting system which comprises a spindle, a turbine mounted on the spindle, a nut having a convexo-concave portion at one face thereof and mounting the turbine on the spindle with the other face thereof, and rotating speed detecting means spaced from the nut in the axial direction of the spindle so as to face the convexo-concave portion of the nut. This system makes the spindle casing compact compared with the prior art arrangement.

According to another aspect of the present invention, there is provided a rotating speed control system which comprises a spindle, a turbine mounted on the spindle, a casing for receiving the spindle and the turbine, a pneumatic source and a line connected to the casing so as to drive the turbine, a valve provided in the pneumatic line to adjust the air flow rate, a sensor for detecting the rotating speed of the turbine, and control means for adjusting the valve based on a comparison of a preset rotating speed with a rotating speed detected by the sensor. This arrangement enables the spindle to rotate at an approximately constant speed since the air supplied to the turbine is changed with the changing cutting load.

According to another aspect of the present invention, there is provided a rotating speed control system which is a modification of the one described immediately above, the control means of which further possesses an element for fully closing the valve when the turbine stops rotating while the value is open. This modification cuts the energy from the air source when the spindle is forced to stop.

DESCRIPTION OF THE PREFERRED EMBODIMENTS

Three embodiments of the present invention will be explained with reference to the accompanying drawings, in which same numerals are given to like elements.

Figure 1:
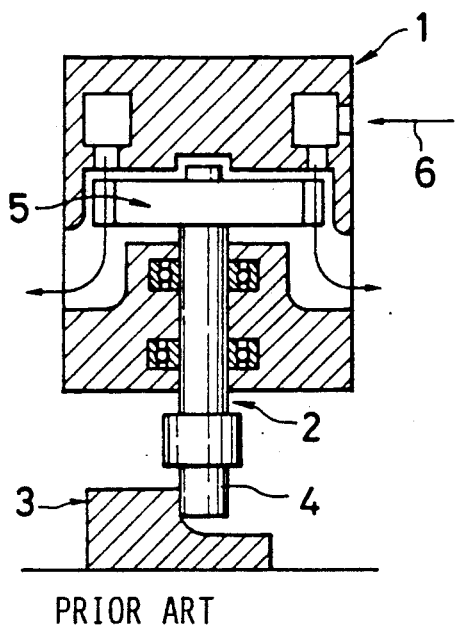
FIG. 1 is a sectional view showing a previously developed machine tool equipped with the pneumatically driven spindle.
Figure 2:
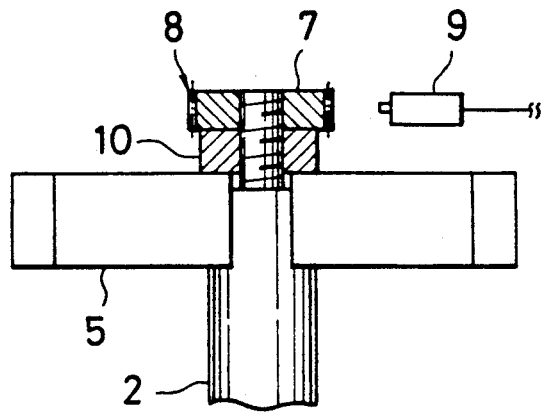
FIG. 2 is a sectional view showing a previously developed rotating speed detecting arrangement.
Figure 3:
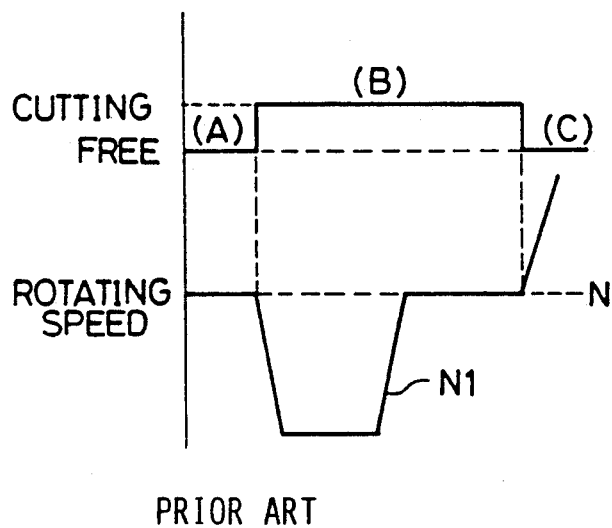
FIG. 3 illustrates the relation between the rotating speed and the cutting mode according to the previously developed arrangement.
Figure 4:
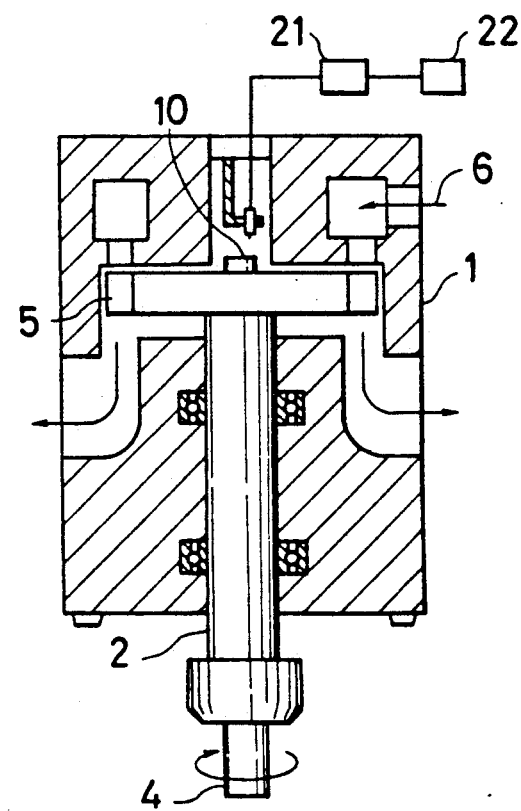
FIG. 4 is a sectional view showing a speed detecting system according to the present invention.

Referring to FIG. 4, a spindle 2 is disposed in a cylindrical casing 1 with a cutting tool 4 being attached to one end thereof and an air turbine 5 to the other end thereof. The air turbine 5 is fixed on the spindle by a nut 10.

Figure 5:
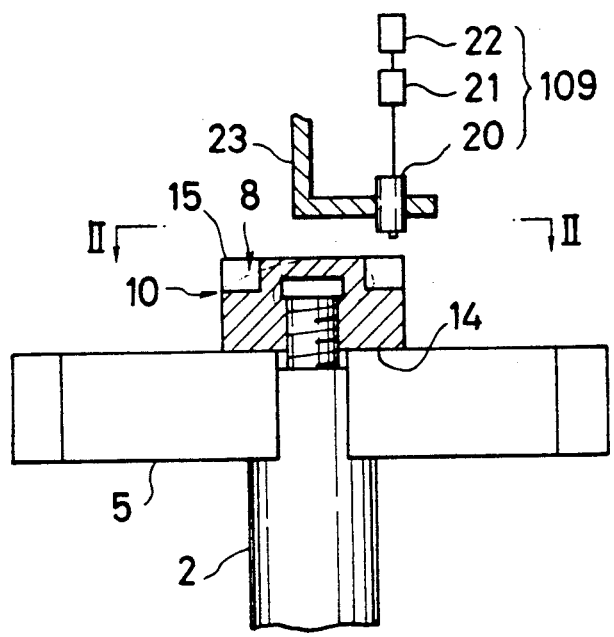
FIG. 5 is a partially enlarged view of FIG. 4.
Figure 6:
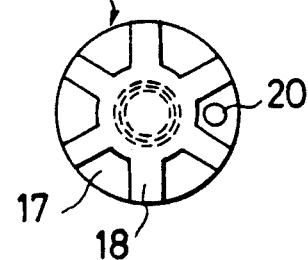
FIG. 6 is a partially enlarged view of FIG. 5.

As illustrated in FIGS. 5 and 6, the nut 10 possesses two faces 14 and 15, one of which faces presses the turbine 5 against the spindle 2 and the other face defines an exposed surface portion. A convexo-concave part 8 defining periodic characteristics is formed in the latter face 15. Numeral 17 designated the concave part and 18 designated the convex part as illustrated in FIG. 6. Inside an opening in the spindle casing, there is provided a rotating speed detector assembly 109. The detector 109 includes an electromagnetic pickup 20 which is connected to a pulse receiver 21 and a single converter 22. The pickup 20 is mounted on a flange 23 extending inside the spindle casing, so as to be spaced apart from the exposed face 15 of the nut 10 in the axial direction of the spindle 2. The electromagnetic pickup 20 detects the magnetic force varying with the rotation of the nut 10. The detected change of the magnetic force is sent to the pulse receiver 21, and is then processed through the signal converter 22.

Since the rotating speed detecting means 109, particularly the pickup 20, is located in the axial direction of the spindle 2, it is not necessary to provide room for the speed detecting means. Therefore, it is possible to manufacture a spindle casing 1 which is compact and therefore the entire cutting machine can be made smaller. Also, the rotating speed of the spindle 2 is detected with high accuracy independently of the presence of lubrication oil. Furthermore, since the nut 10 serves as the tightening means and is a part of the speed detecting means, the number of the elements required for the machine tool is reduced.

Figure 7:
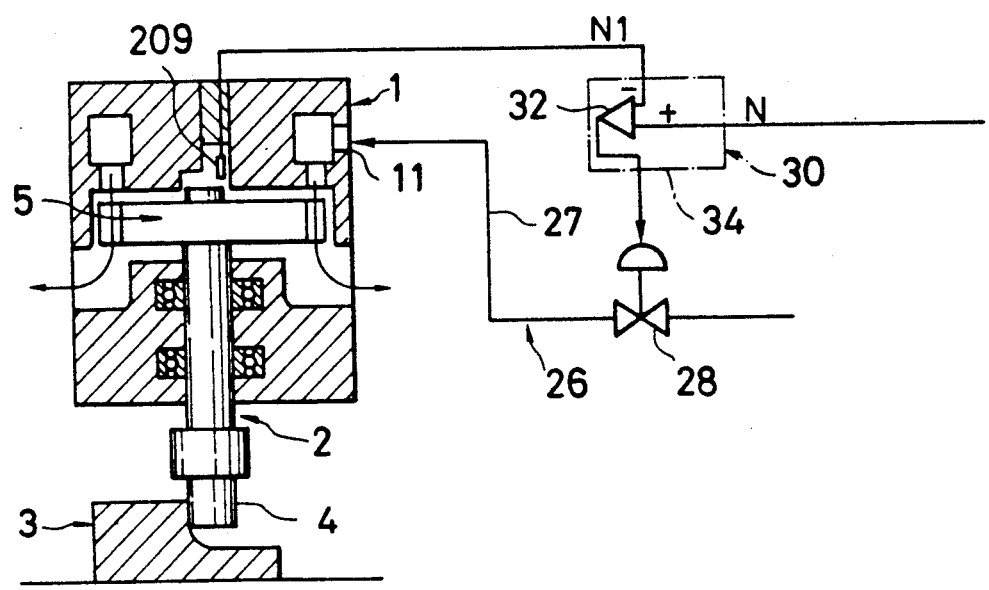
FIG. 7 is a system for controlling the rotating speed according to the present invention.
Figure 8:
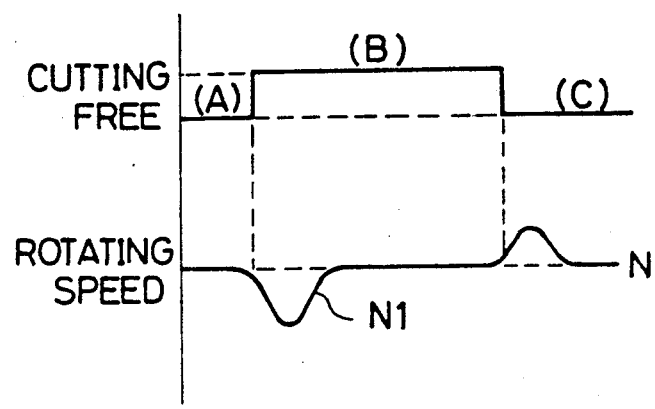
FIG. 8 illustrates the relation between the rotating speed and the cutting mode according to the present invention.

A second embodiment of the present invention is depicted in FIGS. 7 and 8. Referring to FIG. 7, a spindle 2 is disposed in a casing 1 with a cutting tool 4 being attached to one end thereof and an air turbine 5 to the other end thereof. The air turbine 5 is fixed on the spindle by a nut 10. An air inlet opening 11 is bored in the casing 1 such that the turbine 5 is driven by the air supplied through the pneumatic line 26 connected to the opening 11. The pneumatic line 26 includes a pipe 27 extending from a pneumatic source (not shown) to the spindle casing 1 and a valve 28. Rotating speed detecting means 209 is provided in the casing 1, and the speed detecting means 209 is associated with a control device 30.

In this particular embodiment, the control means 30 is mainly constituted by a governor 34 provided with a comparator 32. A predetermined rotating speed N is preset to the comparator 32 in accordance with cutting conditions. The comparator 32 compares N with the actual rotating speed N1 detected by the sensing means 209, and adjusts the valve 28 based on the comparison results. More specifically, the governor 34 changes the opening degree of the valve 28, thereby changing the air volume fed to the turbine 5, so that the actual speed N1 will be adjusted to the preset value N.

FIG. 8 shows the rotating speed of the spindle 2: the tool 4 is spaced apart from the workpiece 3 in mode A, the tool 4 is contacting the workpiece 3 in mode B, and the tool is again spaced apart from the workpiece 3 in mode C. During the mode A, no load is exerted on the tool 4 and the spindle 2, and therefore the spindle 2 rotates at a constant speed N1 equal to the predetermined speed N. The spindle 2 bears load as the cutting starts (mode B), and simultaneously the rotating speed N1 starts dropping. However, the difference between the preset speed N and the actual speed N1 is immediately sensed by the control means 30 through the sensor 209, and in turn the air flow rate across the valve 28 is increased. Accordingly, the rotating speed N1 soon recovers from its drop. At the completion of cutting, the tool 4 leaves the workpiece 3 (mode C) and the spindle 2 no longer bears any load, so that N1 becomes higher than N. In this event, the control means 30 throttles the valve 28 thereby reducing the flow rate of the air supplied to the turbine 5. Therefore, the spindle 2 does not run at an unnecessarily high speed.

According to the above described system, the spindle 2 is rotated at a relatively constant speed, as compared with the conventional arrangement, independently of the cutting load. Also, the accuracy in cutting is improved and the manual labor required in the cutting operation is reduced since the rotating speed is not controlled by an operator.

Figure 9:
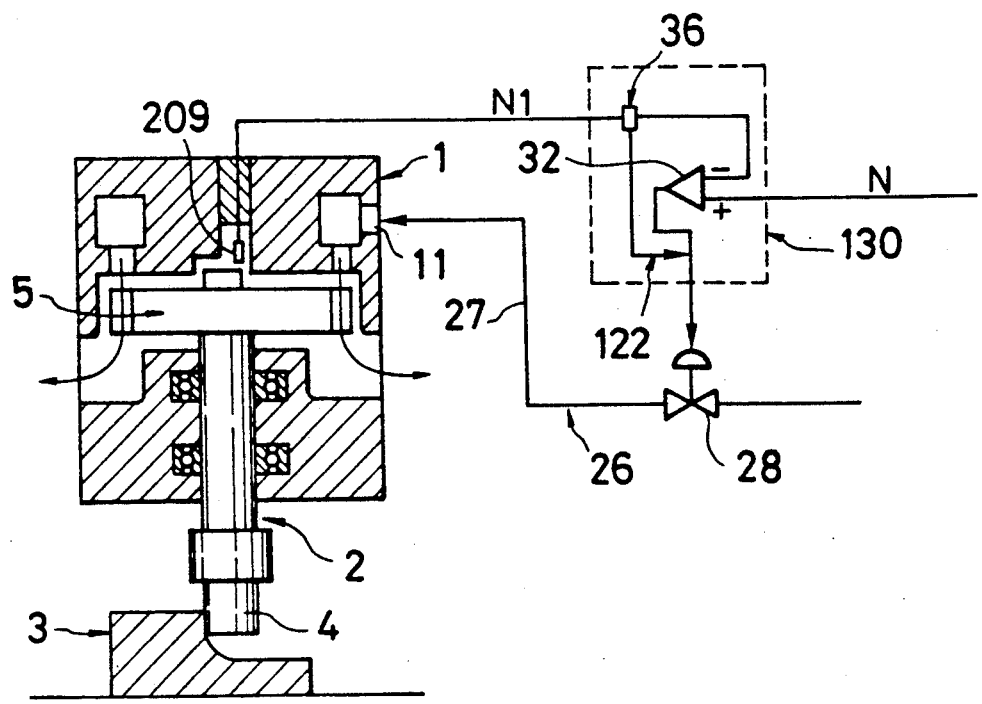
FIG. 9 illustrates another system for controlling the rotating speed of a pneumatically driven spindle according to the present invention.

If the depth of cutting is program-controlled in the machine tool of the second embodiment described above but the program is incorrect, the cutting load might become excessively large which would result in stoppage of the spindle during the cutting mode. In this case, too much air will be fed to the turbine 5 since the difference between N and N1 is very large. Therefore, the spindle 2 would start rotating with rapid acceleration as it is freed, which is dangerous. To avoid this problem, the control means 130 of a third embodiment of the invention employs another element 36, as illustrated in FIG. 9, in addition to the comparator 32 of the second embodiment. A desired rotating speed N is preset to the comparator 32 and is compared with the rotating speed N1 detected by the sensor 209. When N1 is not equal to N, the control means 130 adjusts the valve 28, so as to match N1 to N. The element 36 is activated when the sensor detected rotating speed N1 drops to zero. The control means 130 outputs an instruction 122 to close the valve 28 when the spindle 2 is forced to stop during the cutting mode; in other words when the element 36 is activated and N is not equal to zero. Thus, the spindle 2 will remain stopped once it stops during the cutting mode, thereby improving safety during the cutting operation.

We claim:

1. A system for controlling the rotating speed of a pneumatically operated, turbine driven spindle used in a machine tool, comprising:
    an element for mounting said turbine on said spindle;
    a casing for said spindle and said turbine;
    an air supply line connected to said casing for supplying air to drive said turbine;

a valve disposed in said air supply line for adjusting the flow rate of the air supplied to said turbine;
a sensor for detecting the rotating speed of said turbine; and
control means for closing said valve when the rotating speed (N1) detected by said sensor is zero.

2. The rotating speed control system of claim 1, wherein said control means is operative for comparing the sensor-detected rotating speed (N1) with a predetermined value (N) and adjusting said valve in accordance with the difference between N1 and N so as to reduce the difference of N1 and N when both N1 and N are larger than zero, and said control means closes said valve when N is larger than zero while N1 is zero.

3. The rotating speed control system of claim 1, wherein said mounting element is disposed on one end of said spindle such that one face of said element is exposed in the axial direction of said spindle, and a convexo-concave portion is defined in said exposed face, said sensor being disposed in the axial direction of said spindle and spaced apart from said mounting element so as to face said convexo-concave portion.

4. The rotating speed control system of claim 3, wherein said spindle includes a male-threaded part and said element is defined by a nut engaging said male-threaded part of said spindle.

5. The rotating speed control system of claim 3, wherein said mounting element is disposed on one end of said spindle and includes a face exposed in the axial direction of said spindle, and said exposed face includes a convexo-concave portion formed therein, said sensor being disposed in the axial direction of said spindle and spaced apart from said mounting element so as to face said convexo-concave portion.

6. The rotating speed control system of claim 5, wherein said spindle includes a male-threaded part and said mounting element is a nut engaging said male-threaded part of said spindle.

* * * * *